No. 641,314. Patented Jan. 16, 1900.
A. J. MARTIN.
CLUTCH FOR MOTOR VEHICLES.
(Application filed May 27, 1899.)
(No Model.) 2 Sheets—Sheet 2.
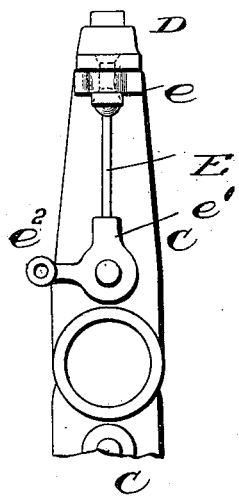
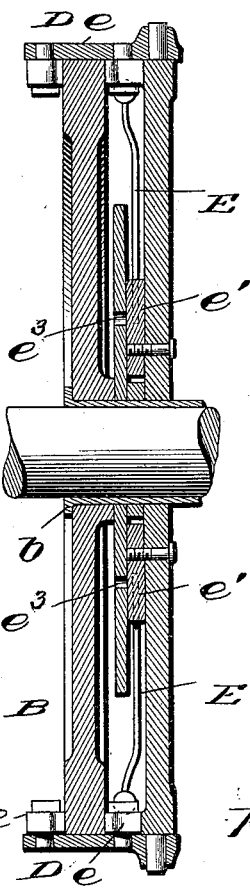
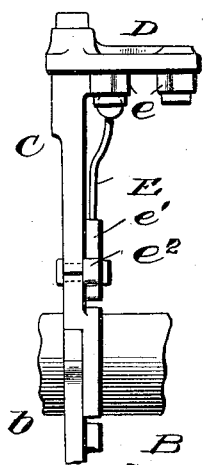
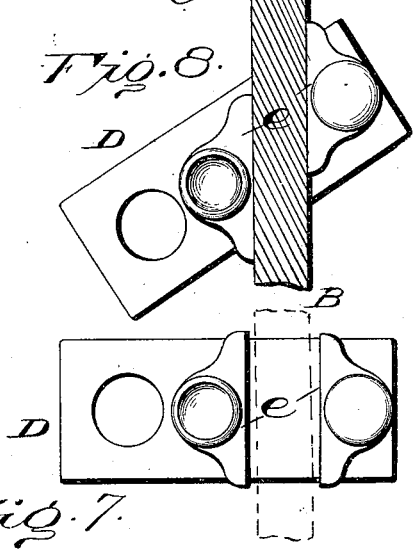
Witnesses
Inventor
Andrew J. Martin
Attorney

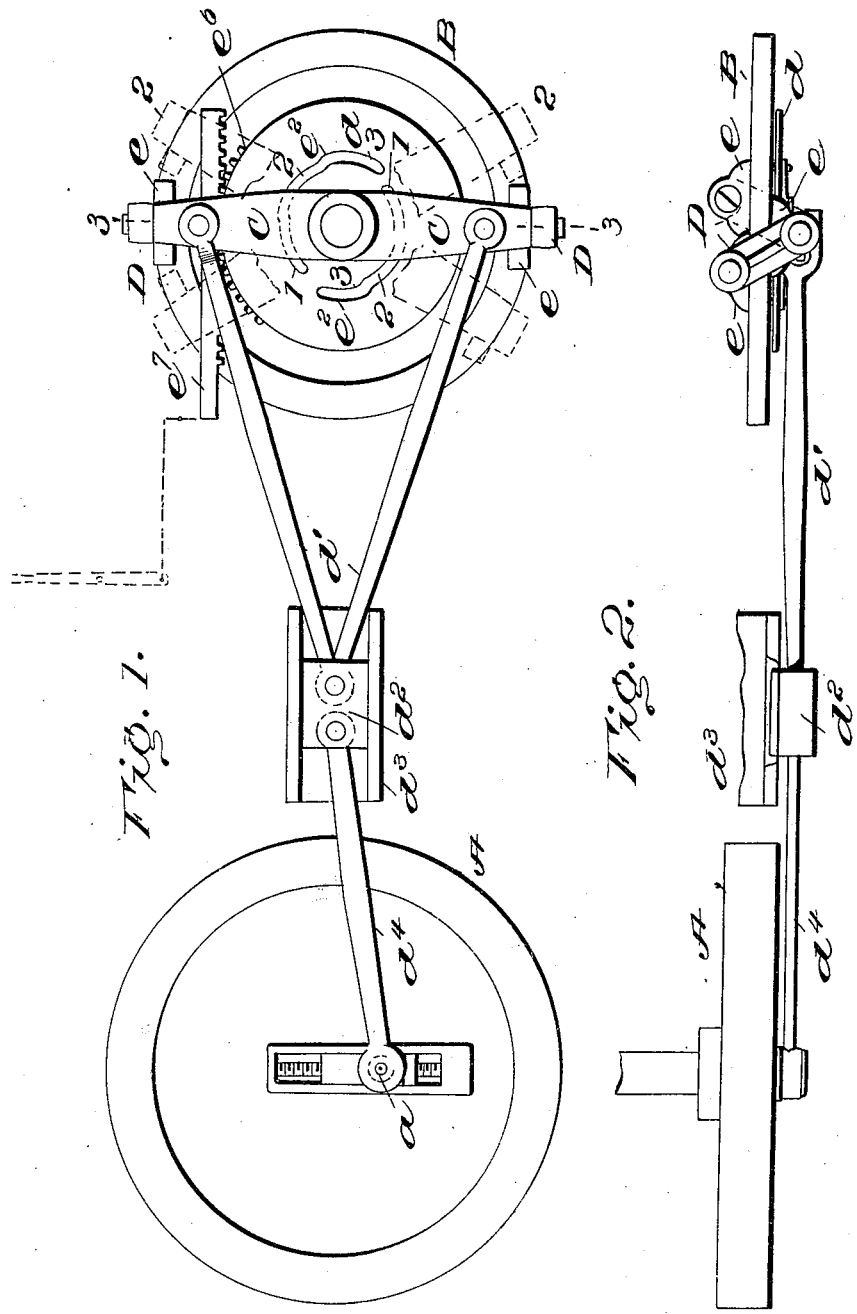

UNITED STATES PATENT OFFICE.

ANDREW J. MARTIN, OF BUFFALO, NEW YORK.

CLUTCH FOR MOTOR-VEHICLES.

SPECIFICATION forming part of Letters Patent No. 641,314, dated January 16, 1900.

Original application filed January 13, 1899, Serial No. 702,077. Divided and this application filed May 27, 1899. Serial No. 718,554. (No model.)

*To all whom it may concern:*

Be it known that I, ANDREW J. MARTIN, of Buffalo, in the county of Erie and State of New York, have invented certain new and useful Improvements in Clutches for Motor-Vehicles; and I do hereby declare the following to be a full, clear, and exact description of the invention, such as will enable others skilled in the art to which it appertains to make and use the same.

This invention contemplates certain new and useful improvements in motor-vehicles, having special reference to clutching mechanism for imparting rotary motions to the carrying-wheels.

The object of the invention is to insure a firm grip or purchase by the clutches on the driven wheels, whose hubs are fast on the same bearings with the carrying-wheels. The invention comprises clutches extended transversely across planes at right angles to the wheel-axis and having contact-points for conforming to and engaging opposite points of such planes. These contact-points may be shifted so that the direction of rotation of the wheel may be varied.

The invention will be hereinafter fully set forth, and particularly pointed out in the claims.

In the accompanying drawings, Figure 1 is a side elevation showing a clutch constructed in accordance with my invention. Fig. 2 is a plan view. Fig. 3 is a vertical sectional view on line 3 3, Fig. 1. Figs. 4 and 5 are views of the clutch-arms and adjuncts, taken at right angles to each other. Fig. 6 is a view of the cam-plate detached. Figs. 7 and 8 are bottom plan views of one of the clutch-plates.

Although my improvements are primarily designed to be employed in connection with a motor-vehicle, it is not essential to a clear understanding thereof that such vehicle be illustrated or described.

In the drawings I have indicated a fly-wheel A, provided with a shiftable crank-pin $a$, by the adjustment of which the speed of the vehicle or other machinery may be controlled; but inasmuch as the invention residing in this feature constitutes the subject-matter of an application for patent, of which this is a division, filed January 13, 1899, Serial No. 702,077, further reference need not be herein made to the fly-wheel and its shiftable crank-pin.

B is the clutch-wheel, which in practice is keyed on a rotary bearing or sleeve $b$, on which is mounted one of the carrying-wheels. (Not shown.) The rear carrying-wheels are preferably those to which the clutch-wheels are thus secured through the intermediary of the sleeve.

C C are two clutch-arms, and $d$ is a cam-disk loose on sleeve $b$. These arms are extended in opposite directions and at their inner ends are loosely mounted on sleeve $b$. Both arms are connected by toggles $d'$ to a cross-head $d^2$, which is movable in a guide-plate $d^3$. This cross-head is connected by a pitman $d^4$ to the shiftable crank-pin of the fly-wheel.

On the outer end of each clutch-arm is loosely mounted a plate D. These plates extend transversely over the periphery of wheel B and serve each as a support for two centrally-pivoted shoes $e$, which face the opposed faces of the sides of the wheel with which when the plates are thrown out of a perpendicular to the clutch-arm—that is, set obliquely to the periphery of the wheel—they engage and firmly bite the sides of the wheel at diagonally opposite points. The inner faces of the shoes are consequently made to conform to the engaging faces on the sides of the wheel when their carrying-plates are set in either of the two oblique positions they are designed to occupy when driving the clutch-wheel. When a carrying-arm is moved in the direction in which its plate is set, the contact-points of the shoes will bite like a vise against the wheel and cause the latter to rotate with the arm, yet on the recovery stroke of each arm the wheel will not be interfered with by the shoes. The two carrying-arms act alternately to effect the rotation of the clutch-wheel—that is, as one arm is on its recovery stroke the wheel is being rotated by the other, the engaging points or shoes of the former allowing the wheel to pass between them without frictional contact. The direction of rotation of the clutch-wheel is controlled by the position in which the contacting plates are set—that is, when the upper plate is thrown with its extremity rearward and the lower plate with its extremity forward the wheel will be rotated in the forward direction and will be moved in the opposite direction when the positions of the plates are reversed. The two clutch-arms are operated synchronously, while their contacting points act on the wheel successively. For instance, to obtain a forward movement of the wheel, and consequently the vehicle, both of the clutch-arms will be forced as far to the rear as possible, (see position indicated by dotted lines 2, Fig. 1,) and the contacting plate of the upper arm is caused to lie obliquely across the periphery of the wheel, with its extreme end pointing to the front, while the plate of the lower arm is positioned with its extreme end pointing rearward. The crank-pin being started forward in the rotation of the fly-wheel, both of the clutch-arms must follow and the clutch-wheel also, since the shoes or contacting points of the plate of the upper arm have the grip and the lower plate is slipping. When the half-revolution of the fly-wheel is completed and the clutch-arms stop on their rearward movement, the contacting points of the lower plate will grip while those of the upper are slipping. In this way the wheel is continuously revolved, the contacting points of one arm acting to pull the wheel and those of the other to push it; but when the plates carrying the contacting points are set on a straight line perpendicular to their arm they will not engage the wheel in the reciprocal movements imparted to the carrying-arms. It is essential to the successful operation of the clutch that the contacting points of each arm be such that they can adjust themselves so as to conform to the engaging faces of the wheel.

E E designate two spring-rods having outer rounded ends fitted in sockets in the inner shoes—that is, those adjoining the pivoted ends of the plates D. Each of these spring-rods projects from a lever $e'$, mounted on the inner end of each clutch-arm and having a lateral extension $e^2$, which fits in a slot $e^3$ of cam-disk $d$. There are two such slots in this cam-disk, and each is composed of three sections 1, 2, and 3. These three sections are concentric with the axis of the disk, but are all on different radii—that is, the radius of the section 1 is less than that of the central section 2, while the radius of the section 3 is greater than that of either of the others. The end sections 1 and 3 open angularly into the central section 2. By adjusting this disk the contacting plates are shifted—that is, when the disk is so set that the extensions $e^2$ of the levers $e'$ will travel in the central sections 2 the plates will extend straight across the periphery of the clutch-wheel and be perpendicular to their carrying-arms; but when the disk is turned so as to throw, say, the end sections 3 into line with the extensions $e'$ the contacting plates will be set so as to rotate the wheel in a forward direction. The arc of each section of each slot controls the radius of movement of the lateral projection of each lever. The positions of the contacting plates will not be altered or disturbed save when the disk is itself turned axially. Hence by shifting this disk the direction of travel of the vehicle may be reversed, or, as on a downgrade, the wheel may be allowed to rotate without aid or hindrance from the clutch-arms.

The means for shifting the cam-disk may be of any preferred form or kind. I have shown it formed in its periphery with rack-teeth $e^6$, with which a rack-bar $e^7$ may engage for this purpose. Likewise other means may be employed for shifting the plates which contact with the engaging faces of the clutch-wheel.

It will be noted that the bite of each of the contact-plates occurring when its arm is moved in the direction of rotation of the clutch-wheel such wheel can under certain conditions travel at an accelerated speed—that is, faster than the movement of the clutch-arm. For instance, in turning a vehicle the carrying-wheel describing the outer circle will, together with the clutch-wheel fixedly connected therewith, travel faster than the clutch-arms, being free to slide or pass between the contacting points of each arm, the same not in any way interfering with this increased or accelerated speed of the clutch-wheel.

I claim as my invention—

1. A clutch comprising a wheel having parallel faces on opposite sides of a plane at right angles to the axis of such wheel, clutch-arms having contact portions for engaging such faces when moved in the direction of the wheel's rotation, and means for changing the positions of the contact portions in relation to said faces for reversing the rotation of the wheel, as set forth.

2. A clutch comprising a wheel having parallel faces on opposite sides of a plane at right angles to the axis of such wheel, clutch-arms having contact portions for engaging such faces when moved in the direction of the wheel's rotation, and means for holding the contact portions out of engagement with said faces, as set forth.

3. A clutch comprising a wheel having parallel faces on opposite sides of a plane at right angles to the axis of such wheel, clutch-arms having contact portions for engaging such faces when moved in the direction of the wheel's rotation, a positively-operated device for changing the positions of the contact portions for reversing the rotation of the wheel, as set forth.

4. A clutch comprising a wheel having parallel faces on opposite sides of a plane at right angles to the axis of such wheel, clutch-arms having each a member projected across such plane, independently-movable contact portions carried by such members for automatically conforming to and engaging diagonally opposite points of such faces, and means for changing the lines of projection of such members and the relative positions of the contact portions for reversing the rotation of the wheel or holding said contact portions out of engagement therewith, as set forth.

5. A clutch comprising a wheel having parallel faces on opposite sides of a plane at right angles to the axis of such wheel, clutch-arms, contact elements designed to engage diagonally opposite points of such faces, supports for such contact elements carried by the clutch-arms, and means for changing the relative positions of such elements for reversing the rotation of the wheel, as set forth.

6. A clutch comprising a wheel having parallel faces on opposite sides of a plane at right angles to the axis of such wheel, clutch-arms, shoes designed to engage and automatically conform to diagonally opposite points on such faces, movable supports for such shoes, carried by the clutch-arms, and means for changing the relative positions of such shoes for reversing the rotation of the wheel, as set forth.

7. A clutch comprising a wheel having parallel faces on opposite sides of a plane at right angles to the wheel-axis, clutch-arms, plates carried by such arms extended transversely of such plane, shoes on the plates for engaging diagonally opposite points of such faces, and a positively-operated device for changing the relative positions of the shoes for reversing the rotation of the wheel or holding said shoes out of engagement therewith, as set forth.

8. The combination with a wheel having parallel faces on opposite sides of a plane at right angles to the wheel-axis, of clutch-arms, shoes, supports therefor carried by such arms, pivoted bearings for such shoes, and means for changing the relative positions of the shoes for reversing the rotation of the wheel, said shoes being adapted to engage diagonally opposite points of said faces, as set forth.

9. The combination with a wheel having engaging faces on opposite sides of a plane at right angles to the wheel-axis, of clutch-arms, pivotally-mounted shoes carried by such arms, and a positively-operated device for binding such shoes against diagonally opposite points of such engaging faces and also for holding them out of engagement with such faces, as set forth.

10. The combination with a wheel having opposite engaging faces at right angles to its axis, of clutch-arms, plates carried by such arms extended transversely across the wheel, shoes mounted on the plates for engaging and conforming to such faces and capable of moving independently of their supporting-plates, and a positively-operated device for changing the positions of the plates for reversing the rotation of the wheel, as set forth.

11. The combination with a wheel having opposite, flat, parallel faces, of clutch-arms, shoes for automatically conforming to said faces and engaging diagonally opposite points thereof, supports for such shoes carried by the clutch-arms, and means for reversing the rotation of the wheel by changing the relative lines of engagement of said shoes, as set forth.

12. The combination with a wheel having opposite faces at right angles to its axis, of clutch-arms, plates carried by such arms extended at right angles to such faces, shoes carried by said plates, rods for shifting the plates, and cam-disks for setting such rods, substantially as set forth.

13. The combination with a wheel having opposite flat faces at right angles to its axis, of clutch-arms, shoes having flat faces designed to conform to the faces of the wheel and to engage diagonally opposite points of such faces, supports for such shoes carried by the clutch-arms, said shoes being capable of moving independently of their supports, and means for changing the positions of said supports for reversing the rotation of the wheel or holding said shoes out of engagement therewith, as set forth.

14. The combination with a wheel having opposite flat faces at right angles to its axis, of clutch-arms, plates pivoted on the arms and extended over the periphery of the wheel, shoes pivoted on the plates, a spring-rod engaging one shoe of each set of shoes for shifting the plates, levers on the arms to which the rods are secured, and a cam-disk having slots into which projections of the levers extend, as set forth.

15. The combination with a clutch-wheel having flat faces, of two oppositely-extended arms having pivoted plates extended across the periphery of the wheel, shoes carried by the plates opposed to said flat faces, and means for setting the plates obliquely and straight across the periphery of the clutch-wheel, substantially as set forth.

16. The combination with a clutch-wheel having engaging faces upon opposite sides of a plane at right angles to the axis of the wheel, of two arms, shiftable plates projected across the said plane, and carried by said arms, shoes mounted on the plates for engaging said faces when said plates are set obliquely to said plane, and means for changing the direction of projection of both of such plates for reversing the rotation of the wheel or holding said shoes out of engagement therewith, substantially as set forth.

17. The combination with a clutch-wheel having flat sides, of two arms mounted on the same axis as the wheel, means connected to the arms for reciprocating them back and forth, shiftable plates carried by said arms, extended across the periphery of the wheel, shoes mounted on the plates for engaging the sides of the wheel, and means for changing the direction of projection of said plates for reversing the rotation of the wheel, substantially as set forth.

18. The combination with a clutch-wheel having flat sides, of two arms mounted on the same axis as the wheel, shiftable plates, carried by the arms, extended across the periphery of the wheel, shoes mounted on the plates, levers on said arms for shifting said plates, and a disk on the same axis as the wheel having two sets of slots with each of which one of the levers engages, each of said slots being composed of a plurality of sections of different radii, substantially as set forth.

19. The combination with a clutch-wheel, of a plurality of clutches engaging the sides of the clutch-wheel, on oblique lines, when moved in the direction of rotation of such wheel, the engagement of such clutches being alternate, means for shifting the engaging portions of each clutch for reversing the rotation of the clutch-wheel or holding the clutches out of engagement therewith, and means for reciprocating the clutches, substantially as set forth.

In testimony whereof I have signed this specification in the presence of two subscribing witnesses.

ANDREW J. MARTIN.

Witnesses:
   MORGINS J. TODD,
   H. P. SEIPP.